United States Patent [19]

Bostan

[11] 4,312,483
[45] Jan. 26, 1982

[54] AIRCRAFT WITH CIRCULAR WING

[76] Inventor: Nicolae Bostan, 2344 Kingsland Ave., Bronx, N.Y. 10469

[21] Appl. No.: 951,198

[22] Filed: Oct. 13, 1978

[51] Int. Cl.³ ...................... B64C 29/04; B64C 17/06
[52] U.S. Cl. .................................. 244/12.2; 244/23 C; 244/39; 244/52
[58] Field of Search ............................. 244/12.1–12.5, 244/23, 39, 52

[56] References Cited

U.S. PATENT DOCUMENTS

| 989,681 | 4/1911 | Woods | 244/39 |
| 3,193,214 | 7/1965 | Hollingsworth | 244/12.2 |
| 3,309,041 | 3/1967 | Etchberger | 244/23 A |
| 3,321,156 | 5/1967 | McMasters | 244/12.2 |
| 3,514,053 | 5/1970 | McGuinness | 244/12.2 |
| 3,612,445 | 10/1971 | Phillips | 244/12.2 |
| 3,752,417 | 8/1973 | Lagace | 244/23 B |
| 3,792,587 | 2/1974 | Kappus | 244/23 B |
| 3,946,970 | 3/1976 | Blankenship | 244/23 C |
| 3,997,131 | 12/1976 | Kling | 244/23 C |
| 4,120,468 | 10/1978 | Fischer | 244/12.2 |

FOREIGN PATENT DOCUMENTS

| 378308 | 10/1907 | France | 244/39 |
| 533751 | 9/1955 | Italy | 244/12.2 |

Primary Examiner—Galen L. Barefoot
Attorney, Agent, or Firm—Brumbaugh, Graves, Donohue & Raymond

[57] ABSTRACT

An aircraft is provided with a circular wing member which is rotatably mounted to a fuselage member. The circular wing member provides lift for horizontal flight and also provides gyroscopic stabilization of aircraft attitude. The circular wing member is substantially free of aerodynamically active flight control or propulsion members and, in a preferred embodiment, has a concentration of mass at its outer rim. The fuselage is provided with propulsion means for effecting and controlling vertical and horizontal flight. The propulsion means provides horizontal or vertical thrust along vectors which pass through the aircraft center of mass.

5 Claims, 7 Drawing Figures

AIRCRAFT WITH CIRCULAR WING

BACKGROUND OF THE INVENTION

This invention relates to powered aircraft and particularly to aircraft having a circular wing member.

Several prior-art patents, including U.S. Pat. Nos. 2,939,648, 3,067,967, 3,503,573, 3,514,053, 3,519,224, and 3,946,970, disclose aircraft with a circular wing member arranged to rotate about the aircraft fuselage and thereby provide gyroscopic stabilization of aircraft attitude. All of these prior-art aircraft are provided with some aerodynamically-active components on the circular wing member for assisting or controlling aircraft flight. In particular, the rotating wing members are most often provided with wing-shaped fins, channels, grooves, or thrust members for providing aircraft lift.

It is an object of the present invention to provide a new and improved aircraft having a circular wing member which is substantially free of aerodynamically-active members.

SUMMARY OF THE INVENTION

In accordance with the present invention, there is provided an aircraft which includes a fuselage member centrally mounted in a wing member. The fuselage member includes propulsion means, flight-control means, and means for operating the propulsion and flight-control means. The wing member comprises a disk with a substantially vertical axis. The disk is arranged for rotation about the axis with respect to the fuselage and is substantially free of aerodynamically-active flight-control or propulsion members. Means is provided for rotating the disk with respect to the fuselage thereby to gyroscopically stabilize the attitude of the aircraft.

The propulsion means on the fuselage is a jet engine which is arranged to provide thrust with a first thrust component along the disk axis and a second thrust component substantially perpendicular to the disk axis. The operating means controls the relative magnitude of the first and second thrust components. The fuselage may be additionally provided with attitude control means comprising reaction motors. The reaction motors may be activated to exert a torque on the fuselage about an axis perpendicular to the disk axis and thereby cause gyroscopic precession of the disk axis and a consequent change in the attitude of the aircraft. Enhanced stabilization of the aircraft can be provided by a concentration of the mass of the wing member at the circumferential edge of the circular wing. This concentration of mass increases the gyroscopic moment of the rotating wing member in relation to overall vehicle weight and rotational speed of the wing member. In accordance with another aspect of the invention, the propulsion means are arranged to provide said first and second thrust components along vectors with directions passing substantially through the center of mass of the aircraft.

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENTS

Figure 1:
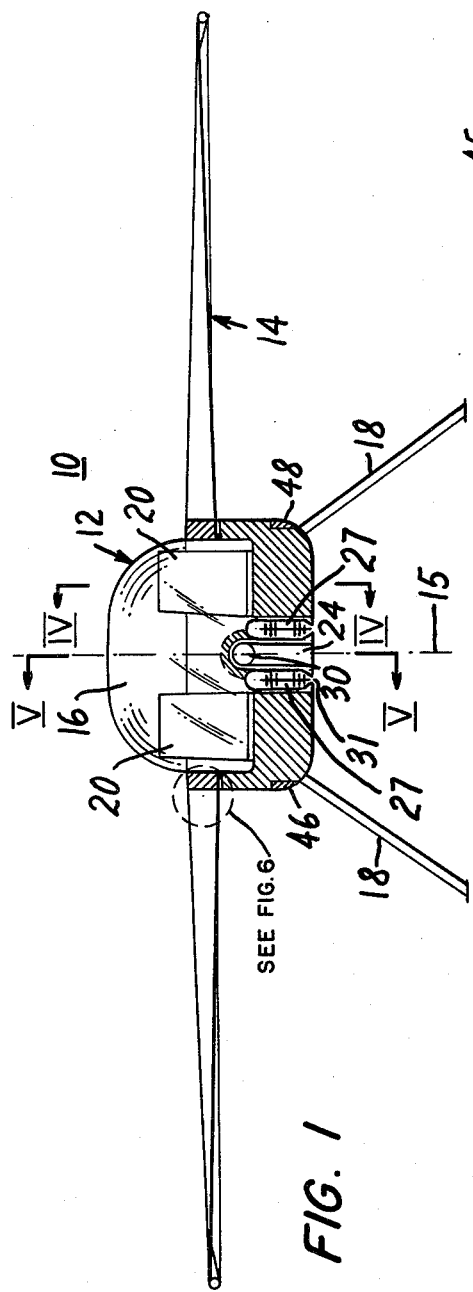
FIG. 1 is a front view, partially in cross-section, of an aircraft in accordance with the present invention.
Figure 2:
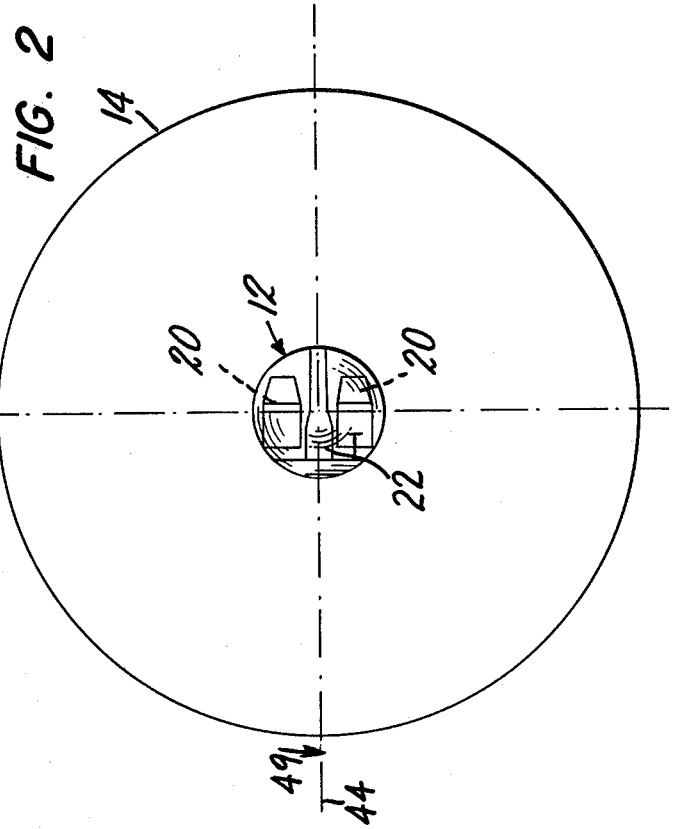
FIG. 2 is a top view of the FIG. 1 aircraft.

FIGS. 1 through 5 show a two-seat utility aircraft 10 constructed in accordance with the present invention. The illustrated utility aircraft 10 is described for purposes of illustration only, and it should be recognized that the advantages inherent in the present invention are equally applicable to aircraft of larger or smaller size and having different configurations and uses; in fact, some advantages, to be described further below, are most important in aircraft having significantly larger sizes.

The aircraft 10 includes a fuselage 12 and a circular air foil or wing member 14. The fuselage 12 includes a cockpit 16 within which seats 20 are provided to accommodate the aircraft pilot and another passenger. Fuselage 12 is also provided with landing gear 18 which comprises struts upon which the aircraft rests when on the ground.

Since the aircraft 10 is capable of vertical takeoff and landing, struts 18 need not be of strong construction to withstand forces of a rolling takeoff or landing, and therefore can have a small aerodynamic cross-section. Struts 18 are retractable into the fuselage to reduce aerodynamic drag during horizontal flight.

Figure 5:
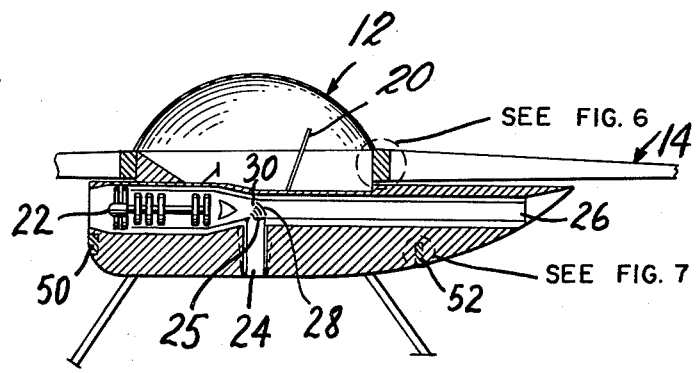
FIG. 5 is a central longitudinal cross-section view of the FIG. 1 aircraft.

A principal propulsion engine 22 of a conventional jet engine design is provided centrally mounted toward the forward end of the fuselage. Engine 22 is used to provide thrust along a vector having a direction along the vertical axis 15 of wing 14 by exhaust of combustion gases through nozzle 24, or alternatively provide thrust in a direction substantially perpendicular to the axis 15 of wing member 14 by exhaust which is directed through nozzle 26. Two control members 25 and 28, visible in FIG. 5 are provided between engine 22 and exhaust nozzles 24 and 26.

When the aircraft has substantially zero horizontal speed, exhaust gases from engine 22 are directed by vanes 28 primarily or exclusively through nozzle 24 to generate thrust along a vector having a direction vertically downward along the axis 15 of the circular wing 14. This axis, and hence the thrust vector, passes substantially through the aircraft center of mass 30.

When the aircraft is to undergo horizontal flight, vanes 28 are retracted into the tube leading to nozzle 24, and some or all of the thrust-producing exhaust gases from engine 22 are directed to exhaust nozzle 26 to produce a horizontal thrust along a vector which is perpendicular to the axis 15 of wing member 14 and passes through the aircraft center of mass 30. When valve 25 is closed, all the thrust from engine 22 is provided to nozzle 26.

Figure 3:
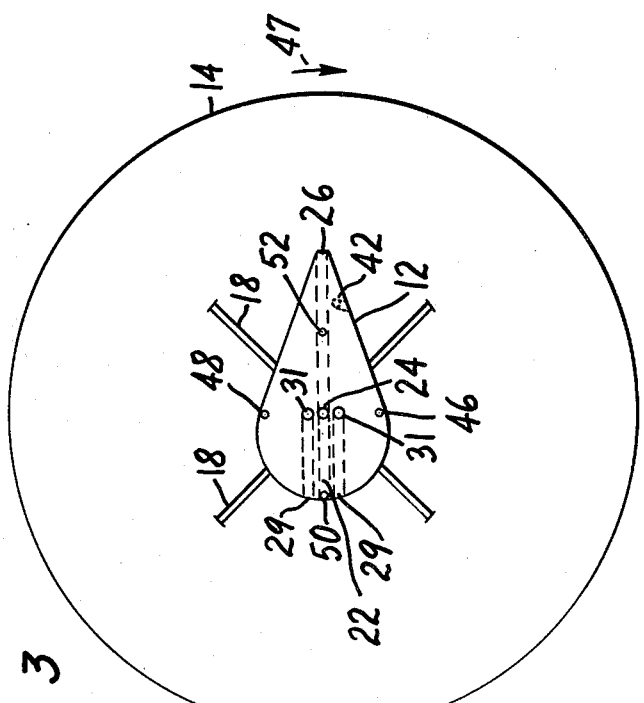
FIG. 3 is a bottom view of an aircraft similar to the FIG. 1 aircraft.
Figure 4:
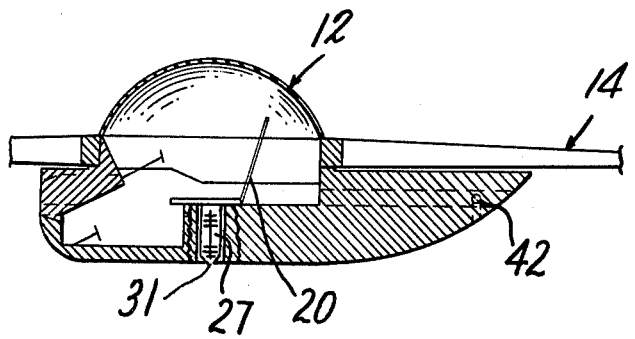
FIG. 4 is a longitudinal cross-section view of the FIG. 1 aircraft.

Generally, it will be necessary to provide an engine capable of producing a thrust substantially in excess of the aircraft weight in order to effect satisfactory vertical climb and a satisfactory rate of slowing of vertical descent. Preferably, the thrust of engine 22 should be 30% in excess of the weight of the vehicle. This amount of engine thrust is not required during horizontal flight. It may therefore be advantageous to provide auxiliary engines for use only during hovering and vertical flight and a main engine for use during all aerial maneuvers. FIGS. 1 and 3 show such an arrangement wherein three engines are provided, a main engine 22 which can provide either vertical or horizontal thrust and auxiliary engines 27 having intakes 29 and downward-pointing exhaust nozzles 31 for use in supplying the necessary excess thrust for vertical takeoff, hovering and landing.

Figure 6:
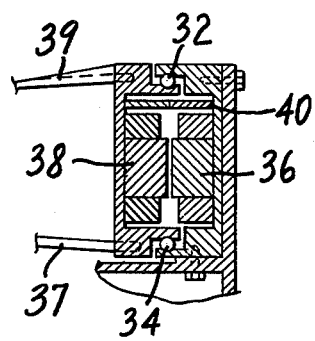
FIG. 6 is a detailed cross-section of the bearing by which the wing of the FIG. 1 aircraft is mounted to the fuselage member.

As previously noted, wing member 14, which is symmetrical about vertical axis 15, is rotatably mounted on fuselage 12 so that the axis 15 of the wing member passes through the aircraft center of mass 30. Wing 14 is mounted for rotation with respect to the fuselage by the provision of bearings 32 and 34, shown in FIG. 6. It will be recognized that other bearing arrangements may be utilized. In order to cause the relative rotation between the fuselage and the wing member, electromagnetic motor poles and coils 36 and 38 are arranged between bearings 32 and 34 so that electric current may be used to counterrotate the two aircraft portions 12 and 14. The motor also includes brush holder and armature assembly 40. A reaction motor 42 is provided on fuselage 12 to provide counterrotational torque and compensate for the tendency of the aircraft fuselage 12 to rotate in opposition to the rotation of wing member 14.

As an alternative to the use of coils 36 and 38 for producing relative rotation between fuselage member 12 and wing member 14, the wing member may be provided with tangentially oriented reaction motors for inducing wing rotation and for acting in opposition to fuselage stabilizing reaction motor 42.

An important feature of the present invention resides in the fact that the wing member 14 provides gyroscopic stabilization of aircraft attitude and is substantially free of aerodynamically active flight control or propulsion members. In the embodiment illustrated in FIGS. 1 through 5, wing member 14 has no aerodynamically active member. Wing member 14 naturally takes part in the flight dynamics of aircraft 10 providing drag during vertical flight and lift, depending on wing shape and aircraft pitch during horizontal flight, but wing 14 does not include any members for affecting the speed or direction of vertical or horizontal flight. Thus, the rotation of wing member 14 is not used to induce any substantial downward thrust for assisting the vertical flight of the aircraft. Likewise, even in an embodiment having reaction engines on wing member 14 for causing rotation of the wing member, the reaction motors are substantially neutral with respect to the aircraft center of mass and provide no propulsion or control of the vertical or horizontal flight of aircraft 10.

As previously noted, a principal function of wing member 14 is to provide gyroscopic stabilization of the attitude of aircraft 10. For this purpose, the mass of wing member 14 is largely concentrated at the outer rim of the wing member. In one embodiment, the outer edge of wing 14 is fabricated out of a 50 milimeter pipe or a wire-wound rim, bent to form the wing edge 6.5 meters in diameter. The wing edge is supported by spoke-like structural members which are covered by sheet metal or other suitable material to form the airfoil surfaces 37 and 39 of the wing. For an aircraft having a 6.5 meter wing diameter and 700 kilograms maximum takeoff weight, the wing might weigh a total of 150 kilograms of which 115 kilograms is concentrated in the circumferential edge.

For the two-passenger aircraft 10 shown in FIGS. 1 through 5, the wing member is rotated at a speed of 1,000 to 1,500 rpm to generate the required gyroscopic stabilization moment. Such high-velocity rotation is facilitated by the fact that the wing member is free of aerodynamically-active flight-control or propulsion members, particularly in the embodiment illustrated, wherein coils 36 and 38 form an electric motor which induces the rotation.

In accordance with the principals of gyroscopic stabilization, any force which tends to rotate the aircraft around an axis perpendicular to the axis of rotation 15 of wing member 14 will cause precession of the axis of rotation about the third perpendicular axis. Thus, a force which is asymmetrical about the aircraft roll axis 44 such as may be caused by one of the reaction motors 46 or 48 will cause precession of rotation axis 15 around pitch axis 45. Thus, for rotation of wing 14 in the direction indicated by arrows 47 and 49, activation of reaction motor 46 will cause an increase in the aircraft pitch angle, and activation of motor 48 will cause a decrease in the aircraft pitch angle. Likewise, activation of motors 50 and 52 to provide a torque around pitch axis 45 will cause precession of rotational axis 15 around roll axis 44, and consequent tilting of the roll angle of the aircraft. Yaw control and despinning of the fuselage member are both provided by reaction motor 42.

Those familiar with aircraft control will recognize that control of the aircraft may be provided by a conventional stick and rudder type control. The yaw jet 42 can be controlled in the same manner as a rudder and the roll and pitch jets 46, 48, 50, and 52 can be controlled using a stick operated by the pilot. Automatic attitude and direction stabilization can be provided by an automatic control circuit responsive to gyroscopic sensors.

Since the air frame of aircraft 10 is free of control surfaces or stabilizers, flight control and maneuvering are different from those of conventional aircraft. Banking (i.e., precession of the rotational axis 15 around the roll axis 44) causes side-slip without yaw change. Turns can be made without banking by changing the yaw of the fuselage and consequently the direction of thrust.

As an alternative to providing multiple control jets 46, 48, 50, and 52, it is possible to provide a single jet mounted to provide thrust in any direction to control aircraft pitch and roll. Such a single jet is preferably mounted pivotably on the axis 15 of wing 14 at a distance from the center of gravity 30.

Figure 7:
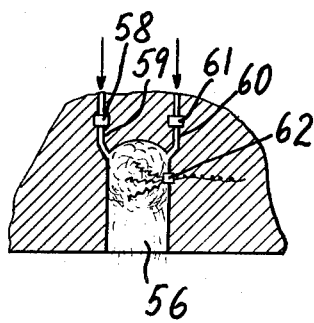
FIG. 7 is a cross-sectional view of an attitude control reaction motor of the type used in the FIG. 1 aircraft.

FIG. 7 is a detailed cross-sectional view illustrating an auxiliary reaction motor which may be used for any of control motors 42, 46, 48, 50, or 52. The motor includes a combustion chamber 56 to which compressed air is supplied over conduit 59 and fuel is supplied over conduit 60. Air and fuel supplies are controlled by valves 59 and 61. Ignition means 62 is provided to ignite the fuel-and-air mixture in combustion chamber 56 and thereby cause a thrust to be generated by the exiting combustion gases.

Typical specifications for a two passenger aircraft 10 in accordance with the invention are as follows:

Wing Diameter: 6.5 m.
Cockpit Diameter: 1.2 m.
Height (excluding landing gear): 1.05 m.
Fuselage length: 2.5 m.
Fuselage width: 1.35 m.
Weight empty: 405 kg.
Payload: 295 kg.
Maximum Takeoff Weight: 700 kg.

Those skilled in the art will recognize that the principles of the present invention can advantageously be applied to aircraft having larger dimensions and different functions. The aircraft described can achieve the high air speed characteristic of fixed-wing jet aircraft and is capable of vertical takeoff and landing characteristic of rotary wing aircraft. Further, the aircraft has high stability and maneuverability thereby making it most suitable for many military missions such as close tactical support.

While the preferred embodiments of the invention have been described, it will be recognized that other and further modifications may be made thereto without departing from the spirit of the invention, and it is intended to claim all such modifications as fall within the true scope of the invention.

I claim:

1. An aircraft for vertical, horizontal, or stationary flight, comprising a wing member and a fuselage member centrally mounted in said wing member, said fuselage member including propulsion means, aerodynamically active flight control means, and means for operating said propulsion and flight control means, said wing member comprising a disk substantially larger than said fuselage and having a substantially vertical axis, said disk being arranged for rotation about said axis with respect to said fuselage, said disk and propulsion means being arranged so that said disk has substantially neutral lift characteristics when rotated, said disk being substantially free of aerodynamically active flight control or propulsion members, whereby said disk provides substantially no lift or thrust during said vertical or stationary flight and means for rotating said disk relative to said fuselage, thereby to gyroscopically stabilize the attitude of said aircraft, said propulsion means comprising a reaction motor having a first exhaust opening for providing a first thrust component along said disk axis and a second exhaust opening for providing a second thrust component substantially perpendicular to said disk axis, said first and second exhaust openings comprising tubular passages, said passages meeting substantially at the center of gravity of said aircraft, and said operating means including means for controlling flow of reaction motor exhaust gases through said exhaust openings thereby to control the relative magnitude of said thrust components.

2. An aircraft as specified in claim 1 wherein the relative mass of said disk is greater in the region near the circumferential edge of said disk than in the adjacent radially inner regions of said disk.

3. An aircraft as specified in claim 2 wherein said disk includes a relatively massive ring forming the circumferential edge of said disk.

4. An aircraft as specified in claim 1 wherein said means for effecting relative rotation comprises an electric motor.

5. An aircraft as specified in claim 4 wherein said electric motor has ring shaped pole members surrounding said fuselage member at the junction of said fuselage member and said wing member.

* * * * *